United States Patent
Ghaus et al.

(10) Patent No.: US 8,937,861 B1
(45) Date of Patent: Jan. 20, 2015

(54) ADDING DIFFERENT CHANNEL PSEUDO-NOISE CODES OF DIFFERENT CARRIERS FOR A WIRELESS COMMUNICATION DEVICE

(71) Applicant: Sprint Communications Company L.P., Overland Park, KS (US)

(72) Inventors: Mohammad Ghaus, Ashburn, VA (US); PinalKumari K. Tailor, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 166 days.

(21) Appl. No.: 13/748,314

(22) Filed: Jan. 23, 2013

(51) Int. Cl.
| | |
|---|---|
| H04L 1/00 | (2006.01) |
| H04W 4/00 | (2009.01) |
| H04W 72/00 | (2009.01) |
| H04W 36/22 | (2009.01) |
| H04W 72/12 | (2009.01) |

(52) U.S. Cl.
CPC .......... *H04W 36/22* (2013.01); *H04W 72/1252* (2013.01)
USPC ............................. 370/230; 370/331; 455/453

(58) Field of Classification Search
None
See application file for complete search history.

(56) References Cited

U.S. PATENT DOCUMENTS

| | | | |
|---|---|---|---|
| 7,145,890 B1 * | 12/2006 | Seo et al. | 370/331 |
| 2005/0239466 A1 * | 10/2005 | Calin et al. | 455/437 |
| 2006/0234718 A1 * | 10/2006 | Barrett et al. | 455/453 |
| 2007/0280161 A1 | 12/2007 | Rudrapatna et al. | |
| 2009/0191891 A1 * | 7/2009 | Ma et al. | 455/456.1 |
| 2010/0291930 A1 | 11/2010 | Xie et al. | |
| 2011/0075637 A1 | 3/2011 | Wu et al. | |

* cited by examiner

*Primary Examiner* — Yemane Mesfin
*Assistant Examiner* — Peter Chen

(57) ABSTRACT

A wireless access node to add different channel pseudo-noise (PN) codes of different carriers to a neighbor list for a wireless communication device communicating over a first carrier frequency provided by the wireless access node comprises a processing system. The processing system is configured to start a loading timer if first communication loading on a second carrier frequency of the wireless access node falls below a first loading threshold, and during the loading timer, compare second communication loading on hand down carriers of a highest priority neighbor to a second loading threshold, and if the second communication loading on at least one of the hand down carriers of the highest priority neighbor falls below the second loading threshold during the loading timer, then add a different channel PN code of the second carrier frequency of the wireless access node to the neighbor list for the wireless communication device.

20 Claims, 5 Drawing Sheets

ADDING DIFFERENT CHANNEL PSEUDO-NOISE CODES OF DIFFERENT CARRIERS FOR A WIRELESS COMMUNICATION DEVICE

TECHNICAL BACKGROUND

Wireless communication devices transmit and receive information wirelessly via a wireless access node to communicate over a communication network. Typically, the wireless access node is part of a radio access network (RAN) which provides the wireless communication devices with access to further communication networks, systems, and devices. The wireless communication devices utilize forward link communication channels to receive voice and/or data transmitted from the wireless access node, and reverse link communication channels to transmit information up to the node. Most wireless access nodes are capable of serving a large number of wireless communication devices at the same time. However, as the number of wireless devices served by a particular wireless access node increases, one or more of the wireless devices may be forced to hand down to a different wireless access network when the node becomes overloaded.

To effectuate a handoff, a wireless communication device typically utilizes a neighbor list that is provided by its serving wireless access node. The neighbor list includes an identification of pilot signals that are continuously transmitted by surrounding wireless access nodes and enables the wireless communication device to acquire the timing of a forward link channel and to compare the signal strength between nodes for determining when to handoff. The pilots are typically divided into an active set, candidate set, neighbor set, and remaining set, which are used by the wireless communication device to search for pilot signals during a handoff.

Overview

A method of operating a wireless access node to add different channel pseudo-noise (PN) codes of different carriers to a neighbor list for a wireless communication device communicating over a first carrier frequency provided by the wireless access node is disclosed. The method comprises comparing a strength of a pilot signal of an active set to a pilot threshold. The method further comprises, when the strength of the pilot signal of the active set falls below the pilot threshold, comparing first communication loading on a second carrier frequency of the wireless access node to a first loading threshold. The method further comprises starting a loading timer if the first communication loading on the second carrier frequency of the wireless access node falls below the first loading threshold. The method further comprises, during the loading timer, comparing second communication loading on hand down carriers of a highest priority neighbor to a second loading threshold. The method further comprises, if the second communication loading on at least one of the hand down carriers of the highest priority neighbor falls below the second loading threshold during the loading timer, then adding a different channel PN code of the second carrier frequency of the wireless access node to the neighbor list for the wireless communication device. The method further comprises transmitting the neighbor list having the different channel PN code of the second carrier frequency for delivery to the wireless communication device.

A wireless access node to add different channel pseudo-noise (PN) codes of different carriers to a neighbor list for a wireless communication device communicating over a first carrier frequency provided by the wireless access node comprises a processing system and a wireless communication transceiver. The processing system comprising circuitry configured to compare a strength of a pilot signal of an active set to a pilot threshold, and when the strength of the pilot signal of the active set falls below the pilot threshold, compare first communication loading on a second carrier frequency of the wireless access node to a first loading threshold. The processing system is further configured to start a loading timer if the first communication loading on the second carrier frequency of the wireless access node falls below the first loading threshold, and during the loading timer, compare second communication loading on hand down carriers of a highest priority neighbor to a second loading threshold. The processing system is further configured to, if the second communication loading on at least one of the hand down carriers of the highest priority neighbor falls below the second loading threshold during the loading timer, add a different channel PN code of the second carrier frequency of the wireless access node to the neighbor list for the wireless communication device. The wireless communication transceiver is configured to transmit the neighbor list having the different channel PN code of the second carrier frequency for delivery to the wireless communication device.

A computer apparatus to add different channel pseudo-noise (PN) codes of different carriers to a neighbor list for a wireless communication device communicating over a first carrier frequency provided by a wireless access node is disclosed. The computer apparatus comprises software instructions and at least one non-transitory computer-readable storage medium storing the software instructions. The software instructions are configured, when executed by a the wireless access node, to direct the wireless access node to compare a strength of a pilot signal of an active set to a pilot threshold, and when the strength of the pilot signal of the active set falls below the pilot threshold, compare first communication loading on a second carrier frequency of the wireless access node to a first loading threshold. The software instructions are further configured to direct the wireless access node to start a loading timer if the first communication loading on the second carrier frequency of the wireless access node falls below the first loading threshold, and during the loading timer, compare second communication loading on hand down carriers of a highest priority neighbor to a second loading threshold. The software instructions are further configured to direct the wireless access node to, if the second communication loading on at least one of the hand down carriers of the highest priority neighbor falls below the second loading threshold during the loading timer, add a different channel PN code of the second carrier frequency of the wireless access node to the neighbor list for the wireless communication device. The software instructions are further configured to direct the wireless access node to transmit the neighbor list having the different channel PN code of the second carrier frequency for delivery to the wireless communication device.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
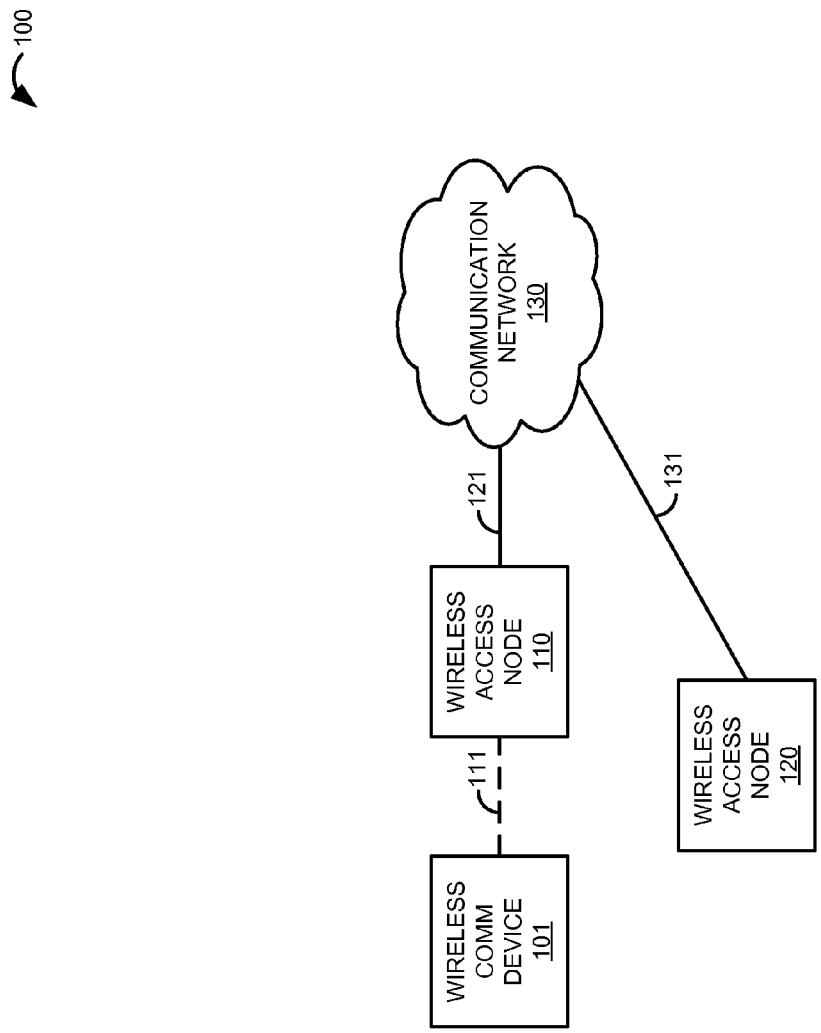
FIG. 1 is a block diagram that illustrates a communication system.

FIG. 1 is a block diagram that illustrates communication system 100. Communication system 100 includes wireless communication device 101, wireless access nodes 110 and 120, and communication network 130. Wireless communication device 101 and wireless access node 110 are in communication over wireless communication link 111. Wireless access node 110 and communication network 130 communicate over communication link 121. Likewise, wireless access node 120 and communication network 130 are in communication over communication link 131.

Figure 2:
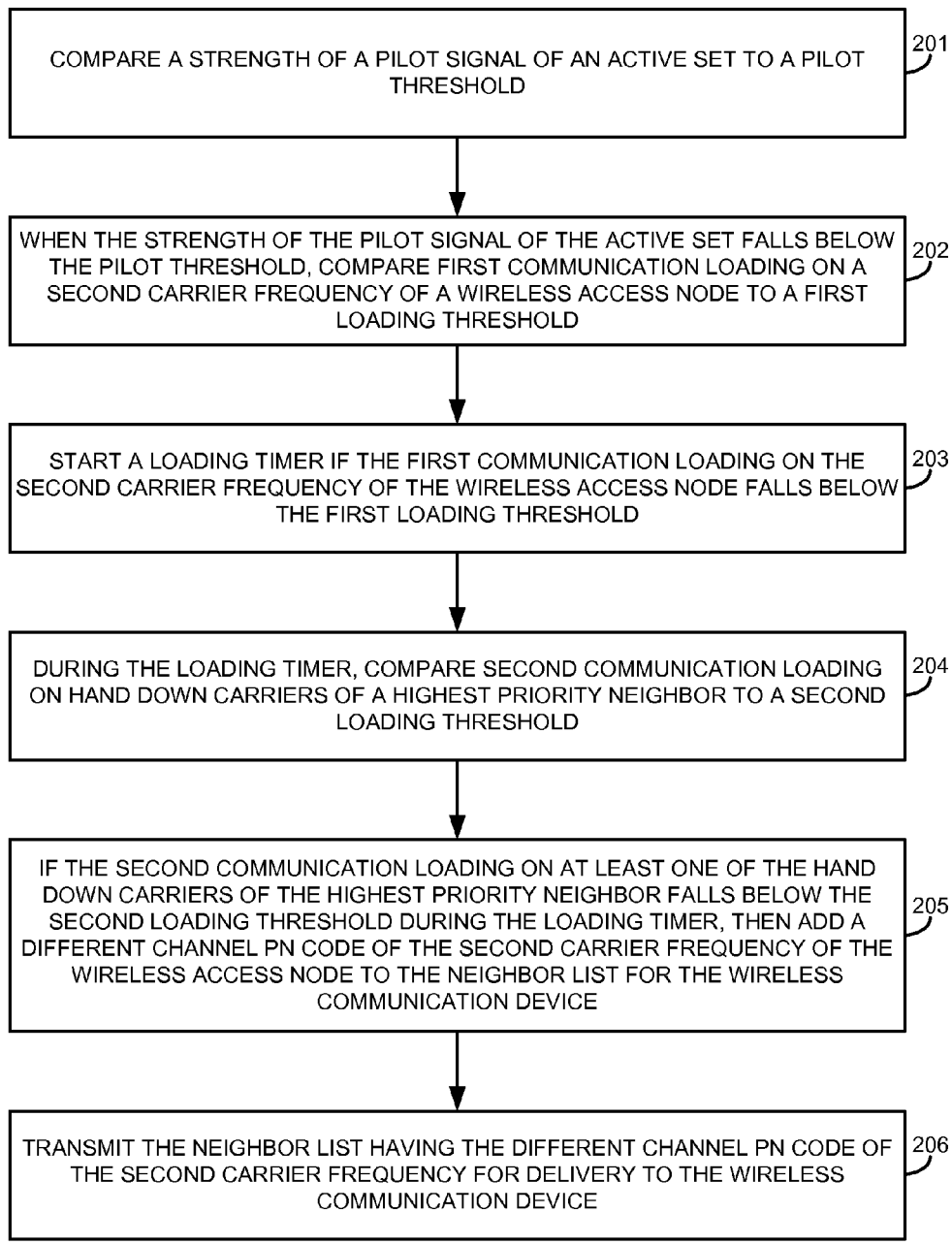
FIG. 2 is a flow diagram that illustrates an operation of the communication system.

FIG. 2 is a flow diagram that illustrates an operation of communication system 100. The steps of the operation are indicated below parenthetically. The operation of communication system 100 shown in FIG. 2 may be employed by wireless access node 110 to add different channel pseudo-noise (PN) codes of different carriers to a neighbor list for wireless communication device 101 communicating over a first carrier frequency provided by wireless access node 110.

To begin, wireless access node 110 compares a strength of a pilot signal of an active set to a pilot threshold (201). Typically, each wireless access node 110 and 120 continuously transmits a pilot signal that enables wireless communication device 101 to acquire the timing of a forward link channel and to compare the signal strength between wireless access nodes for determining when to handoff. The pilot signals may also be transmitted by nodes 110 and 120 on a per-sector basis in some examples. The active set for wireless communication device 101 would typically include a set of pilot signals associated with communication channels assigned to wireless communication device 101 as provided in the neighbor list for wireless communication device 101. Wireless access node 110 thus continuously checks the strength of the pilot signal in the active set for wireless communication device 101 and compares the pilot signal strength to a pilot threshold. The pilot threshold could be set to any signal strength level for comparison to the strength of the pilot signal of the active set. In some examples, the pilot threshold is set to a level that is greater than a signal strength level of an off frequency search condition that triggers wireless communication device 101 to start an off frequency search.

When the strength of the pilot signal of the active set falls below the pilot threshold, wireless access node 110 compares first communication loading on a second carrier frequency of wireless access node 110 to a first loading threshold (202). The first communication loading on the second carrier frequency of wireless access node 110 could be measured in a variety of ways, such as a number of users presently utilizing the second carrier frequency of wireless access node 110, an amount of bandwidth and/or timeslots being consumed, or any other metric that indicates an amount of communication loading. Of course, the first loading threshold that is compared to the first communication loading on the second carrier frequency of wireless access node 110 would typically be in provided in comparable units to whatever technique is used to measure the first communication loading.

The second carrier frequency of wireless access node 110 is a different frequency than the first carrier frequency over which wireless communication device 101 is communicating. For example, the second carrier frequency could be a higher frequency than the first carrier frequency. In some examples, wireless access node 110 uses a wireless protocol of a same type to communicate with wireless communication device 101 over the first carrier frequency and the second carrier frequency, such as an evolution-data optimized (EV-DO) wireless protocol. The first and second carrier frequencies of wireless access node 110 are typically provided on a per-sector basis. For example, the first carrier frequency over which wireless communication device 101 is initially communicating with wireless access node 110 could be on a first sector provided by wireless access node 110, and the second carrier frequency could also be on the first sector. Thus, when comparing the first communication loading on the second carrier frequency of wireless access node 110 to the first loading threshold, wireless access node 110 could compare the first communication loading of the second carrier frequency of the first sector of wireless access node 110 to the first loading threshold.

Wireless access node 110 starts a loading timer if the first communication loading on the second carrier frequency of wireless access node 110 falls below the first loading threshold (203). The loading timer could be set to any duration. Typically, the loading timer will be set to a duration that is long enough for wireless access node 110 to compare communication loading on hand down carriers of a highest priority neighbor to another loading threshold, but of a short enough duration that wireless communication device 101 will not begin an off-frequency search before the loading timer expires.

During the loading timer, wireless access node 110 compares second communication loading on hand down carriers of a highest priority neighbor to a second loading threshold (204). In some examples, the second communication loading could represent individual communication loading on multiple sectors of the highest priority neighbors. For example, when comparing the second communication loading on the hand down carriers of the highest priority neighbor to the second loading threshold, wireless access node 110 could compare communication loading on different carrier frequencies of individual sectors provided by wireless access node 110 and on individual sectors provided by wireless access node 120. In some examples, the hand down carriers of the highest priority neighbor could include sectors of wireless access node 110 other than the first sector of wireless access node 110 that was providing the first carrier frequency over which wireless communication device 101 was initially communicating with wireless access node 110.

The second communication loading on the hand down carriers of the highest priority neighbor could be measured in a variety of ways, such as a number of users presently utilizing the hand down carriers of the highest priority neighbor, an amount of bandwidth and/or timeslots being consumed on these carriers, or any other metric that indicates an amount of communication loading. Of course, the second loading threshold that is compared to the second communication loading on the hand down carriers of the highest priority neighbor would typically be in provided in comparable units to whatever technique is used to measure the second communication loading. In some examples, the second loading threshold is lower than the first loading threshold.

If the second communication loading on at least one of the hand down carriers of the highest priority neighbor falls below the second loading threshold during the loading timer, then wireless access node 110 adds a different channel PN code of the second carrier frequency of wireless access node 110 to the neighbor list for wireless communication device 101 (205). In some examples, wireless access node 110 will add the different channel PN code of the second carrier frequency of wireless access node 110 to the neighbor list if any carrier frequency on any individual sector on one of the hand down carriers of the highest priority neighbors falls below the second loading threshold during the loading timer.

Wireless access node 110 then transmits the neighbor list having the different channel PN code of the second carrier frequency for delivery to wireless communication device 101 (206). By adding the different channel PN code of the second carrier frequency of wireless access node 110 to the neighbor list for wireless communication device 101 and transmitting the updated neighbor list to device 101, wireless access node 110 effectively enables wireless communication device 101 to find and utilize the second carrier frequency of wireless access node 110 when device 101 performs an off frequency search. Thus, in some examples, wireless communication device 101 performs an off frequency search after receiving the neighbor list having the different channel PN code of the second carrier frequency and hands down from the first carrier frequency provided by wireless access node 110 to the second carrier frequency provided by wireless access node 110.

Typically, if wireless access node 110 had not modified the neighbor list for wireless communication device 101 by adding the different channel PN code of the second carrier frequency of wireless access node 110, then upon performing an off frequency search, wireless communication device 101 would have handed down to a different wireless protocol than the one utilized by the first carrier frequency provided by wireless access node 110 but that is still provided on the same carrier frequency as the first carrier frequency. Advantageously, by performing an off frequency search after receiving the neighbor list having the different channel PN code of the second carrier frequency provided by wireless access node 110, wireless communication device 101 may hand down to a different (second) carrier frequency provided by wireless access node 110, but continue to utilize the same wireless protocol as the first carrier frequency provided by wireless access node 110. In this manner, the user of wireless communication device 101 is ensured better connection reliability and sustainability over the same wireless protocol, substantially improving per-user throughput and the customer experience.

Referring back to FIG. 1, wireless communication device 101 comprises any device having wireless communication connectivity with hardware and circuitry programmed to function as a telecommunications device, such as Radio Frequency (RF) communication circuitry and an antenna. The RF communication circuitry typically includes an amplifier, filter, modulator, and signal processing circuitry. Wireless communication device 101 may also include a user interface, memory system, software, processing circuitry, or some other communication components. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, B, and C, Third Generation Partnership Project Long Term Evolution (3GPP LTE), LTE Advanced, Worldwide Interoperability for Microwave Access (WiMAX), IEEE 802.11 protocols (Wi-Fi), Bluetooth, Internet, telephony, or any other wireless network protocol that facilitates communication between wireless communication device 101 and wireless access node 110.

Wireless access nodes 110 and 120 individually comprise RF communication circuitry and an antenna. The RF communication circuitry typically includes an amplifier, filter, RF modulator, and signal processing circuitry. Wireless access nodes 110 and 120 may also comprise a router, server, memory device, software, processing circuitry, cabling, power supply, network communication interface, structural support, or some other communication apparatus. Wireless access nodes 110 and 120 could comprise a base station, Internet access node, telephony service node, wireless data access point, or some other wireless communication system—including combinations thereof. Some examples of wireless access nodes 110 and 120 include a base transceiver station (BTS), base station controller (BSC), radio base station (RBS), Node B, enhanced Node B (eNodeB), and others—including combinations thereof. Wireless network protocols that may be utilized by wireless access nodes 110 and 120 include CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof.

Communication network 130 comprises the core network of a wireless communication service provider, and could include routers, gateways, telecommunication switches, servers, processing systems, or other communication equipment and systems for providing communication and data services. Communication network 130 could comprise wireless communication nodes, telephony switches, Internet routers, network gateways, computer systems, communication links, or some other type of communication equipment—including combinations thereof. Communication network 130 may also comprise optical networks, asynchronous transfer mode (ATM) networks, packet networks, radio access networks (RAN), local area networks (LAN), metropolitan area networks (MAN), wide area networks (WAN), or other network topologies, equipment, or systems—including combinations thereof. Communication network 130 may be configured to communicate over metallic, wireless, or optical links—including combinations thereof. Communication network 130 may be configured to use time-division multiplexing (TDM), Internet Protocol (IP), Ethernet, optical networking, wireless protocols, communication signaling, or some other communication format—including combinations thereof. In some examples, communication network 130 includes further access nodes and associated equipment for providing communication services to many wireless communication devices across a large geographic region.

Wireless communication link 111 uses the air or space as the transport medium. Wireless communication link 111 may use various protocols, such as CDMA, GSM, UMTS, HSPA, EV-DO, EV-DO rev. A, B, and C, 3GPP LTE, LTE Advanced, WiMAX, Wi-Fi, Bluetooth, Internet, telephony, or some other communication format—including combinations thereof. Wireless communication link 111 may comprise many different signals sharing the same link. For example, wireless communication link 111 could include multiple signals operating in a single propagation path comprising multiple communication sessions, frequencies, timeslots, transportation ports, logical transportation links, network sockets, IP sockets, packets, or communication directions—including combinations thereof.

Communication links 121 and 131 use metal, air, space, optical fiber such as glass or plastic, or some other material as the transport medium—including combinations thereof. Communication links 121 and 131 could use various communication protocols, such as TDM, IP, Ethernet, telephony, optical networking, hybrid fiber coax (HFC), communication signaling, wireless protocols, or some other communication format—including combinations thereof. Communication links 121 and 131 may be direct links or could include intermediate networks, systems, or devices.

Figure 3:
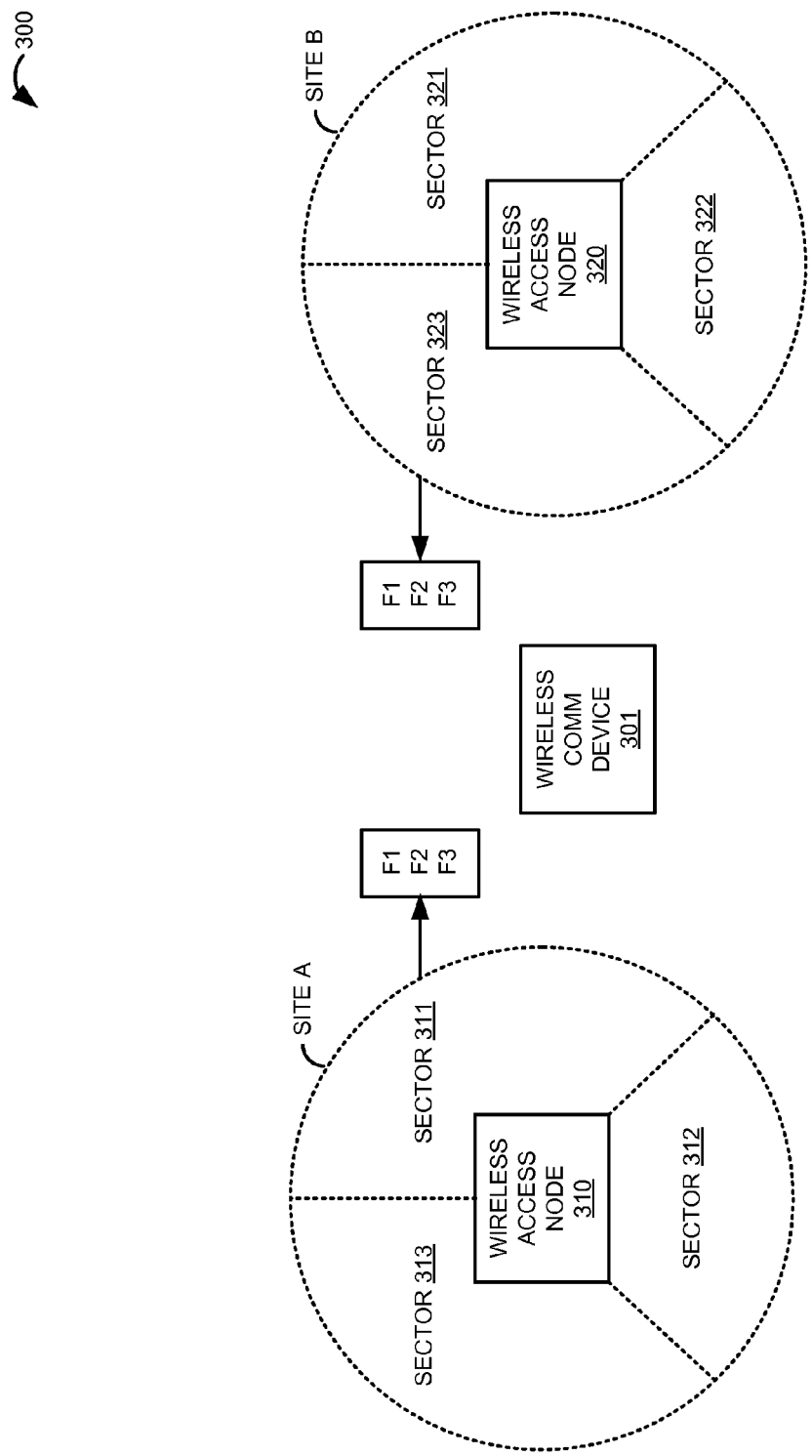
FIG. 3 is a block diagram that illustrates a communication system in an exemplary embodiment.

FIG. 3 is a block diagram that illustrates communication system 300 in an exemplary embodiment. Communication system 300 includes wireless communication device 301 and wireless access nodes 310 and 320. Wireless access node 310 provides sectors 311, 312, and 313 which together form cell site "A". Likewise, wireless access node 320 provides sectors 321, 322, and 323 which together form cell site "B". As shown in FIG. 3, sectors 311 and 323 both provide carrier frequencies F1, F2, and F3. The other sectors 312, 313, 321, and 322 also provide carrier frequencies F1, F2, and F3, although these are not shown in FIG. 3 for clarity.

In this example, wireless communication device 301 is currently being served by carrier frequency F3 on sector 311 of site A using the EV-DO wireless protocol. For carrier load balancing, under the existing neighbor list addition techniques, wireless access node 310 will add the following neighbors for sector 311 on the F3 carrier: F3 of sector 312, F3 of sector 313, F3 of sector 323, and F3 of sector 322. However, this technique fails to add the strong pilot PN from a different channel to a different carrier frequency other than F3 in the candidate set PNs of the neighbor list for wireless communication device 301. Unfortunately, when the serving sector 311 on carrier frequency F3 becomes overloaded, wireless communication device 301 will eventually hand down to the 1xRTT network using the neighbor list generated by the regular existing neighbor list addition technique instead of handing down to a different carrier frequency on the EV-DO network. The algorithm described in FIG. 4 addresses this problem with an improved neighbor list addition technique for wireless access node 310.

Figure 4:
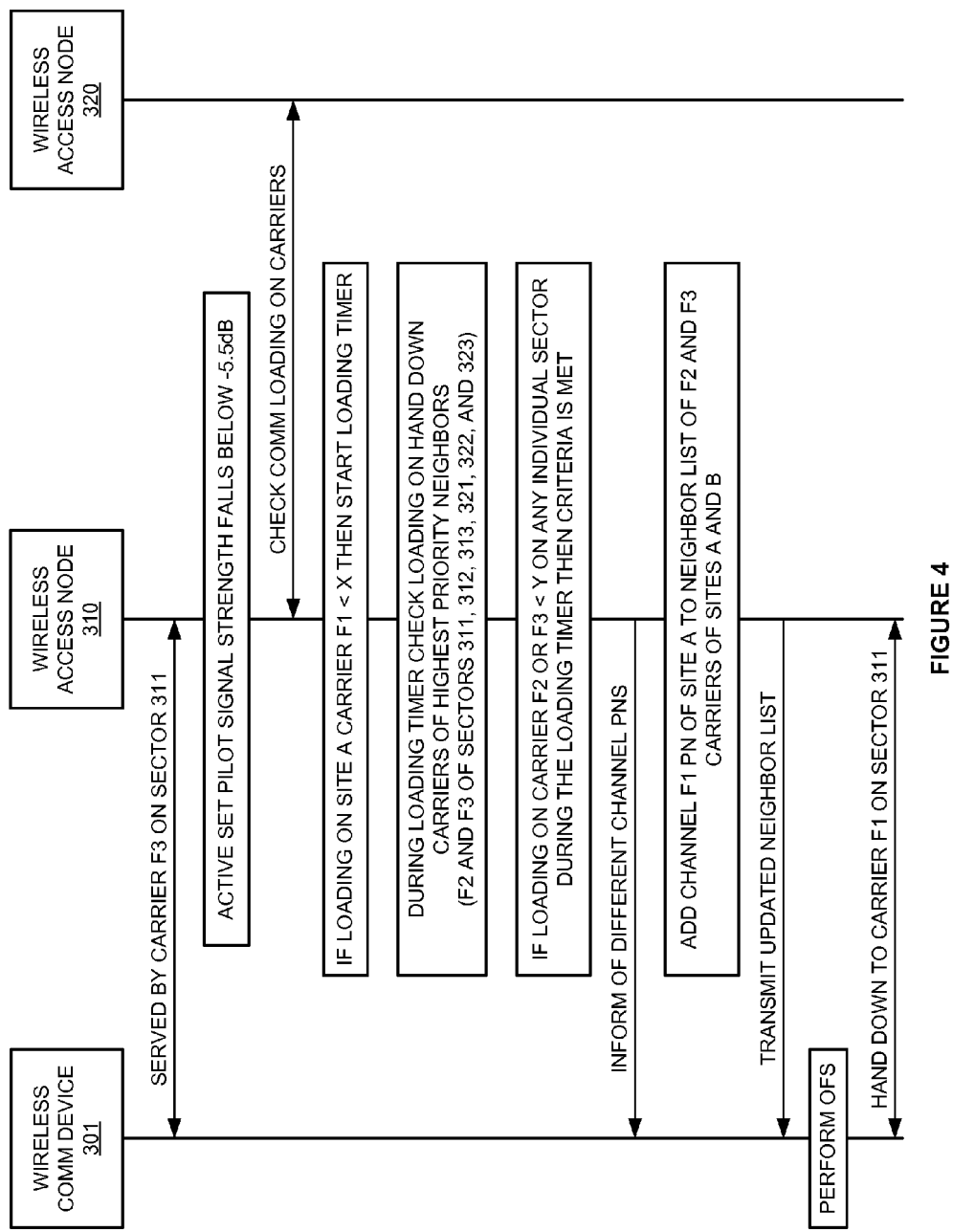
FIG. 4 is a sequence diagram that illustrates an operation of a communication system in an exemplary embodiment.

FIG. 4 is a sequence diagram that illustrates an operation of communication system 300 in an exemplary embodiment. As explained above with respect to FIG. 3, in this example wireless communication device 301 is initially being served by carrier F3 on sector 311 of site A. Wireless access node 310 monitors the signal strength of the pilot signal of the active set in the neighbor list for wireless communication device 301 and waits for the active set pilot strength to fall below a threshold. The threshold that wireless access node 310 waits for the active set pilot strength to fall below is set slightly above the pilot strength level that triggers wireless communication device 301 to start an off frequency search. In this example, the threshold for the active set pilot strength is set to −5.5 decibels, because wireless communication device 301 is configured to start an off frequency search when the active set pilot strength reaches −5 decibels.

When the active set pilot strength falls below −5.5 decibels in this example, wireless access node 310 dynamically checks the communication loading on carriers at sites A and B. If the communication loading on carrier F1 of sector 311 of site A is less than a loading threshold (labeled variable "X" in FIG. 4) then wireless access node 310 starts a loading timer. In this example, the communication loading on the carriers is measured in an amount of active users, and the loading threshold "X" is set to 45 active users. Therefore, wireless access node 310 starts the loading timer when the number of active users on carrier F1 of sector 311 of site A is less than 45 active users.

During the loading timer, wireless access node 310 checks the communication loading on hand down carriers of the highest priority neighbors. In this example, the hand down carriers of the highest priority neighbors are carrier frequencies F2 and F3 of sectors 311, 312, and 313 of site A and carriers F2 and F3 of sectors 321, 322, and 323 of site B. For each individual sector, wireless access node 310 will compare the F2 and F3 carriers to another loading threshold (labeled variable "Y" in FIG. 4). In this example, the communication loading on the carriers is measured in an amount of active users, and the loading threshold "Y" is set to 25 active users. Therefore, if the number of active users on either of the F2 or F3 hand down carriers is less than 25 on any individual sector 311, 312, 313, 321, 322, or 323 during the loading timer, then the criteria for this algorithm is met. If the criteria is met, wireless access node 310 sends a message to wireless communication device 301 informing device 301 that the criteria for this algorithm was met within the loading timer. If the timer expires or if the loading criteria is not met for all of the individual sectors then wireless access node 310 will follow the regular existing neighbor list addition techniques.

Once the criteria is met, wireless access node 310 will send a message to wireless communication device 301 to inform it about the underlying different channel PNs that are available. Wireless access node 310 will then at least add the channel F1 PN of sector 311 of site A to the neighbor list of F2 and F3 carriers of sites A and B. In some examples, wireless access node 310 could add the following sector carrier PNs to the neighbor list for wireless communication device 301 after load checking: F1 of sector 311 of site A, F1 of sector 312 of site A, F1 of sector 322 of site B, and F1 of sector 323 of site B. Wireless access node 310 then transmits the updated neighbor list having the different channels PNs to wireless communication device 301.

After receiving the updated neighbor list, the active set pilot strength falls below −5 decibels which triggers wireless communication device 301 to perform an off frequency search. Since the channel F1 PN code of sector 311 of site A was added on the hand down carriers in the neighbor list, wireless communication device 301 will hand down from F3 to F1. Advantageously, wireless communication device 301 will find the strong pilot PN codes on the different channels in the candidate set of the neighbor list and stay on the EV-DO network using the higher carrier frequency F1 instead of handing down to the 1xRTT network on the same carrier frequency F3 which would result under the regular existing neighbor list addition techniques. The algorithm described in FIG. 4 takes into account the communication loading on each carrier and will balance traffic among the different carriers. Typically, all of the surrounding multi-carrier sites will run this algorithm to add different channel higher PN codes on higher carriers to their neighbor lists. In some examples, these techniques can be implemented in areas having a high number of 1xRTT hand downs as a result of EV-DO carrier overloading, helping to reduce the number of 1xRTT hand downs and ensure improved EV-DO connection reliability and sustainability, especially in heavily loaded sites such as urban areas. This algorithm will also substantially improve overall data rates, sector throughput, and ultimately the user's experience.

Figure 5:
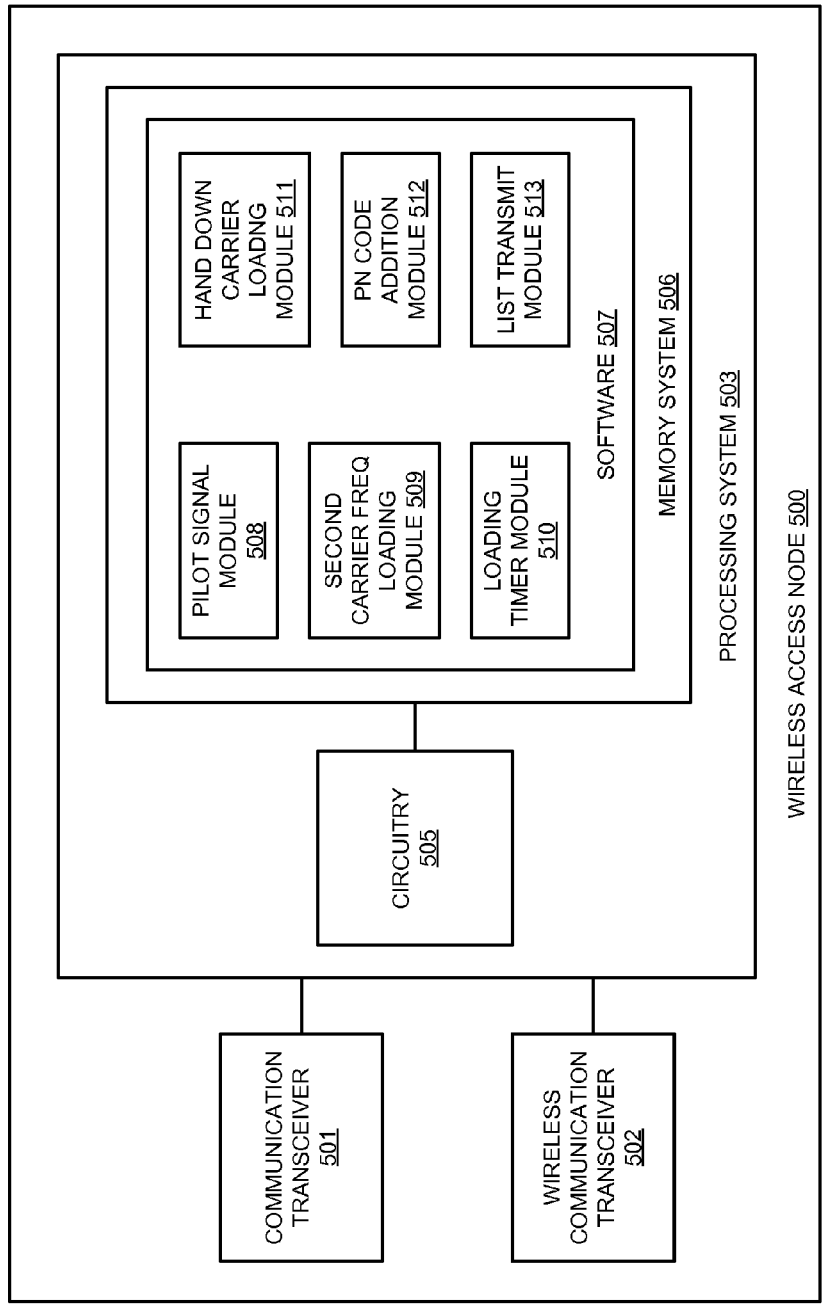
FIG. 5 is a block diagram that illustrates a wireless access node.

FIG. 5 is a block diagram that illustrates wireless access node 500. Wireless access node 500 provides an example of wireless access nodes 110 and 310, although nodes 110 and 310 may have alternative configurations. Wireless access node 500 comprises communication transceiver 501, wireless communication transceiver 502, and processing system 503. Processing system 503 is linked to communication transceiver 501 and wireless communication transceiver 502. Processing system 503 includes processing circuitry 505 and memory system 506 that stores operating software 507. Operating software 507 comprises software modules 508-513.

Communication transceiver 501 comprises components that communicate over communication links, such as network cards, ports, RF transceivers, processing circuitry and software, or some other communication components. Communication transceiver 501 may be configured to communicate over metallic, wireless, or optical links. Communication transceiver 501 may be configured to use TDM, IP, Ethernet, optical networking, wireless protocols, communication signaling, or some other communication format—including combinations thereof.

Wireless communication transceiver 502 comprises RF communication circuitry and an antenna. The RF communication circuitry typically includes an amplifier, filter, RF modulator, and signal processing circuitry. Wireless communication transceiver 502 may also include a memory system, software, processing circuitry, or some other communication device. Wireless communication transceiver 502 may use various protocols, such as CDMA, GSM, UMTS, HSPA, EV-DO, EV-DO rev. A, B, and C, 3GPP LTE, WiMAX, Wi-Fi, Bluetooth, Internet, telephony, or some other wireless communication format. Wireless communication transceiver 502 could be configured to communicate with a wireless communication device over a first carrier frequency. Wireless communication transceiver 502 is also configured to transmit a neighbor list having a different channel PN code of a second carrier frequency for delivery to a wireless communication device.

Processing circuitry 505 comprises microprocessor and other circuitry that retrieves and executes operating software 507 from memory system 506. Processing circuitry 505 may comprise a single device or could be distributed across multiple devices—including devices in different geographic areas. Processing circuitry 505 may be embedded in various types of equipment. Memory system 506 comprises a non-transitory computer readable storage medium, such as a disk drive, flash drive, data storage circuitry, or some other hardware memory apparatus. Memory system 506 may comprise a single device or could be distributed across multiple devices—including devices in different geographic areas. Memory system 506 may be embedded in various types of equipment. In some examples, a computer apparatus could comprise memory system 506 and operating software 507. Operating software 507 comprises computer programs, firmware, or some other form of machine-readable processing instructions. Operating software 507 may include an operating system, utilities, drivers, network interfaces, applications, or some other type of software. In this example, operating software 507 comprises software modules 508-513, although software 507 could have alternative configurations in other examples.

When executed by circuitry 505, operating software 507 directs processing system 503 to operate as described herein for wireless access node 110. In particular, operating software 507 may direct processing system 503 to direct wireless communication transceiver 502 to communicate with a wireless communication device over a first carrier frequency. Operating software 507 directs processing system 503 to compare a strength of a pilot signal of an active set to a pilot threshold. Operating software 507 further directs processing system 503 to, when the strength of the pilot signal of the active set falls below the pilot threshold, compare first communication loading on a second carrier frequency of wireless access node 500 to a first loading threshold. Operating software 507 directs processing system 503 to start a loading timer if the first communication loading on the second carrier frequency of wireless access node 500 falls below the first loading threshold. Additionally, operating software 507 directs processing system 503 to, during the loading timer, compare second communication loading on hand down carriers of a highest priority neighbor to a second loading threshold. Further, operating software 507 directs processing system 503 to, if the second communication loading on at least one of the hand down carriers of the highest priority neighbor falls below the second loading threshold during the loading timer, then add a different channel PN code of the second carrier frequency of wireless access node 500 to the neighbor list for the wireless communication device. Operating software 507 directs processing system 503 to direct wireless communication transceiver 502 to transmit the neighbor list having the different channel PN code of the second carrier frequency for delivery to the wireless communication device.

In this example, operating software 507 comprises a pilot signal software module 508 that compares a strength of a pilot signal of an active set to a pilot threshold. In addition, operating software 507 comprises a second carrier frequency loading software module 509 that compares first communication loading on a second carrier frequency of wireless access node 500 to a first loading threshold when the strength of the pilot signal of the active set falls below the pilot threshold. Further, operating software 507 comprises a loading timer software module 510 that starts a loading timer if the first communication loading on the second carrier frequency of wireless access node 500 falls below the first loading threshold. Operating software 507 also comprises a hand down carrier loading software module 511 that compares second communication loading on hand down carriers of a highest priority neighbor to a second loading threshold during the loading timer. In addition, operating software 507 comprises a PN code addition software module 512 that adds a different channel PN code of the second carrier frequency of wireless access node 500 to the neighbor list for the wireless communication device if the second communication loading on at least one of the hand down carriers of the highest priority neighbor falls below the second loading threshold during the loading timer. Finally, operating software 507 comprises a list transmit software module 513 that transmits the neighbor list having the different channel PN code of the second carrier frequency for delivery to the wireless communication device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless access node to add different channel pseudo-noise (PN) codes of different carriers to a neighbor list for a wireless communication device communicating over a first carrier frequency provided by the wireless access node, the method comprising:
   comparing a strength of a pilot signal of an active set to a pilot threshold;
   when the strength of the pilot signal of the active set falls below the pilot threshold, comparing first communication loading on a second carrier frequency of the wireless access node to a first loading threshold;

starting a loading timer if the first communication loading on the second carrier frequency of the wireless access node falls below the first loading threshold;

during the loading timer, comparing second communication loading on hand down carriers of a highest priority neighbor to a second loading threshold;

if the second communication loading on at least one of the hand down carriers of the highest priority neighbor falls below the second loading threshold during the loading timer, then adding a different channel PN code of the second carrier frequency of the wireless access node to the neighbor list for the wireless communication device; and transmitting the neighbor list having the different channel PN code of the second carrier frequency for delivery to the wireless communication device.

2. The method of claim 1 wherein the wireless communication device communicating over the first carrier frequency provided by the wireless access node comprises the wireless communication device communicating over the first carrier frequency of a first sector provided by the wireless access node.

3. The method of claim 2 wherein comparing the first communication loading on the second carrier frequency of the wireless access node to the first loading threshold comprises comparing the first communication loading of the second carrier frequency of the first sector of the wireless access node to the first loading threshold.

4. The method of claim 3 wherein the hand down carriers of the highest priority neighbor include sectors of the wireless access node other than the first sector of the wireless access node.

5. The method of claim 1 wherein the pilot threshold is greater than a signal strength level of an off frequency search condition that triggers the wireless communication device to start an off frequency search.

6. The method of claim 1 wherein the wireless access node uses a wireless protocol of a same type to communicate with the wireless communication device over the first carrier frequency and the second carrier frequency.

7. The method of claim 6 wherein the wireless protocol of the same type comprises an evolution-data optimized (EV-DO) wireless protocol.

8. The method of claim 1 wherein the second carrier frequency is a higher frequency than the first carrier frequency.

9. The method of claim 1 wherein the wireless communication device performs an off frequency search after receiving the neighbor list having the different channel PN code of the second carrier frequency.

10. A wireless access node to add different channel pseudo-noise (PN) codes of different carriers to a neighbor list for a wireless communication device communicating over a first carrier frequency provided by the wireless access node, the wireless access node comprising:

a processing system comprising circuitry configured to compare a strength of a pilot signal of an active set to a pilot threshold, and when the strength of the pilot signal of the active set falls below the pilot threshold, compare first communication loading on a second carrier frequency of the wireless access node to a first loading threshold, start a loading timer if the first communication loading on the second carrier frequency of the wireless access node falls below the first loading threshold, and during the loading timer, compare second communication loading on hand down carriers of a highest priority neighbor to a second loading threshold, and if the second communication loading on at least one of the hand down carriers of the highest priority neighbor falls below the second loading threshold during the loading timer, then add a different channel PN code of the second carrier frequency of the wireless access node to the neighbor list for the wireless communication device; and a wireless communication transceiver configured to transmit the neighbor list having the different channel PN code of the second carrier frequency for delivery to the wireless communication device.

11. The wireless access node of claim 10 wherein the wireless communication device communicating over the first carrier frequency provided by the wireless access node comprises the wireless communication device communicating over the first carrier frequency of a first sector provided by the wireless access node.

12. The wireless access node of claim 11 wherein the processing system configured to compare the first communication loading on the second carrier frequency of the wireless access node to the first loading threshold comprises the processing system configured to compare the first communication loading of the second carrier frequency of the first sector of the wireless access node to the first loading threshold.

13. The wireless access node of claim 12 wherein the hand down carriers of the highest priority neighbor include sectors of the wireless access node other than the first sector of the wireless access node.

14. The wireless access node of claim 10 wherein the pilot threshold is greater than a signal strength level of an off frequency search condition that triggers the wireless communication device to start an off frequency search.

15. The wireless access node of claim 10 wherein the second carrier frequency is a higher frequency than the first carrier frequency.

16. A computer apparatus to add different channel pseudo-noise (PN) codes of different carriers to a neighbor list for a wireless communication device communicating over a first carrier frequency provided by a wireless access node, the apparatus comprising:

software instructions configured, when executed by the wireless access node, to direct the wireless access node to compare a strength of a pilot signal of an active set to a pilot threshold, and when the strength of the pilot signal of the active set falls below the pilot threshold, compare first communication loading on a second carrier frequency of the wireless access node to a first loading threshold, start a loading timer if the first communication loading on the second carrier frequency of the wireless access node falls below the first loading threshold, and during the loading timer, compare second communication loading on hand down carriers of a highest priority neighbor to a second loading threshold, and if the second communication loading on at least one of the hand down carriers of the highest priority neighbor falls below the second loading threshold during the loading timer, then add a different channel PN code of the second carrier frequency of the wireless access node to the neighbor list for the wireless communication device, and transmit the neighbor list having the different channel PN code of the second carrier frequency for delivery to the wireless communication device; and at least one non-transitory computer-readable storage medium storing the software instructions.

17. The computer apparatus of claim 16 wherein the wireless communication device communicating over the first carrier frequency provided by the wireless access node comprises the wireless communication device communicating over the first carrier frequency of a first sector provided by the wireless access node.

18. The computer apparatus of claim 17 wherein the software instructions configured to direct the wireless access node to compare the first communication loading on the second carrier frequency of the wireless access node to the first loading threshold comprises the software instructions configured to direct the wireless access node to compare the first communication loading of the second carrier frequency of the first sector of the wireless access node to the first loading threshold.

19. The computer apparatus of claim 18 wherein the hand down carriers of the highest priority neighbor include sectors of the wireless access node other than the first sector of the wireless access node.

20. The computer apparatus of claim 16 wherein the pilot threshold is greater than a signal strength level of an off frequency search condition that triggers the wireless communication device to start an off frequency search.

* * * * *